United States Patent [19]

Miyata

[11] Patent Number: 4,830,349

[45] Date of Patent: May 16, 1989

[54] HYDRAULIC CLAMP WITH A SWINGING CLAMP ARM

[75] Inventor: Ichiro Miyata, Amagasakishi, Japan

[73] Assignee: Kabushiki Kaisha Kosmek, Hyogoken, Japan

[21] Appl. No.: 100,554

[22] Filed: Sep. 22, 1987

[30] Foreign Application Priority Data

Sep. 22, 1986 [JP] Japan .......................... 61-145246[U]
Sep. 22, 1986 [JP] Japan .......................... 61-145247[U]

[51] Int. Cl.[4] ........................................ B23Q 3/08

[52] U.S. Cl. ............................ 269/32; 269/239; 269/157

[58] Field of Search .................... 269/27, 32, 239, 157

[56] References Cited

U.S. PATENT DOCUMENTS 3,504,906 4/1970 Hart .................................. 269/239
3,700,227 10/1972 Sessody ............................. 269/32

*Primary Examiner*—Robert C. Watson
*Attorney, Agent, or Firm*—Lowe, Price, LeBlanc, Becker & Shur

[57] ABSTRACT

A hydraulic clamp is provided that is suited for fixing a workpiece on the table of a machining center work pallet and the like. In a clamp housing there are arranged a swingable clamp arm and a hydraulic cylinder one before the other longitudinally, the clamp arm being pivotably supported near the lower end thereof to be freely swingable longitudinally, an elastic body is provided to extend from the clamp arm at the middle in height to a constituent member of the hydraulic cylinder so that the clamp arm is pushed back to be inward of the front face of the clamp housing in the absence of hydraulic oil pressure, while the clamp arm is driven forward by a piston of the hydraulic cylinder to be beyond of the front face thereof when sufficient oil pressure is provided to the hydraulic cylinder.

13 Claims, 6 Drawing Sheets

HYDRAULIC CLAMP WITH A SWINGING CLAMP ARM

BACKGROUND OF THE INVENTION

The present invention relates to a hydraulic clamp for securing a workpiece to a work-holding plate such as a table or work-pallet of a machining center. More specifically it relates to a hydraulic clamp of a clamp arm and a hydraulic cylinder arranged in a clamp housing one before the other longitudinally so that the clamp arm is swung longitudinally by the hydraulic cylinder.

This invention pertains to an improvement of a prior art machine whose basic construction is as shown in FIGS. 11 through 13. FIG. 11 shows a prior art counterpart described in Japanese laid-open utility model application No. 191227/84, and FIG. 12 and 13 show another prior art of which the present inventor is aware. With regard to these references art counterparts 1 and 2, parts and members having like functions are referred to by like numerals.

Referring to FIGS. 12 and 13, a hydraulic clamp 202 comprises a clamp arm 204 and a hydraulic cylinder 205 arranged one before the other longitudinally in a clamp housing 203, the clamp arm 204 is pivotally held by a fulcrum shaft 209 extending from both walls 207, 207 of the clamp housing 203 to be freely swingable longitudinally. An elastic body 257 is to push back the clamp arm 204 to be inward of the front face of the clamp housing 203, while it is driven outward of the front face of the same when a piston 214 of the hydraulic cylinder 205 is driven forward.

The effective of this basic construction is described below under reference mainly to FIG. 12 and FIG. 13. The clamp housing 203 has its front and rear ends secured to a work pallet 201 by means of plurality bolts 237, the clamp arm 204 is swung forward by hydraulically driving forward the piston 214 of the hydraulic cylinder 205, a workpiece W (or die) is pressed by the clamp arm 204 against a work holder 201*a* (as shown in the figure by a two-dot chain line) and the workpiece W, thus clamped, is worked on or work using a die is carried out. When the work is over, the clamp arm 204 is swung back by the elastic body 257 into the clamp housing 203 automatically as the piston 14 is retracted.

With the clamp in the above-described condition, an inverting moment is caused to push up the clamp housing 203 with its rear end edge as fulcrum by the clamp reaction force R applied by the workpiece W (or die) to the clamp arm 204. The fastening force of the above-mentioned bolts 237, however, offsets this inverting moment and the clamp housing 203 is held on the work pallet 201.

According to the prior art 1 FIG. 11, the above-mentioned construction had means for pushing back the clamp arm 204 arranged as follows. In the clamp housing 203 a spring room 261 is formed below the hydraulic cylinder 205, an elastic body 257 consisting of a compressive coil spring is housed therein and the springy force of the elastic body 257 is transmitted to the clamp arm 204 via a link mechanism 262.

According to this prior art, however, the height of the clamp housing 203 is increased by that of the spring room 261 to make the hydraulic clamp bulky and, worse, the required link mechanism causes an increase of the number of the constituent parts to thereby make the composition of the hydraulic clamp 202 more complicated.

In the basic construction of the prior art see FIGS. 12 and 13, the elastic body for pushing back the clamp arm 204 is formed as follows. The elastic body 257 consists of a torsion coil spring, a through notch 258 is provided near the lower end of the clamp arm 204 for housing therein the spring extending axially with respect to a fulcrum shaft 209, in the notch 258 the fulcrum shaft 209 has set thereon the elastic body 257 consisting of the torsion coil spring with one end thereof held by the clamp housing 203 and the other end thereof connected with the through notch 258.

The above-described construction of this prior art, which will eliminate or solve the problems of the earlier described prior art per FIG. 11, has the following defects.

(1) Debris such as cutting chips is allowed to easily get into the clamp housing 203 through the notch 258 for housing the spring during working of the workpiece W, and such debris may find its way onto the back of the clamp arm 204 or the sliding face of the piston 214 to cause malfunction thereof;

(2) since the point of application of force of the elastic body 257, i.e. the other end thereof 257*b*, is located in the vicinity of axis of the fulcrum shaft 209, the arm length of the moment of the push-back force of the elastic body 257 is short, hence it is impossible to powerfully push back the clamp arm 204 at the time of unclamping;

(3) although the clamp reaction force R applied by the workpiece W of the clamp 204 during clamping is held by the fulcrum 209 of the clamp arm 204, the clamp arm 204 has formed therein the notch 258, hence the force applied by the clamp arm 204 to the fulcrum shaft 209 acts near either axial end of the fulcrum shaft 209. Accordingly, the bending moment and/or shearing force acting on the fulcrum shaft 209 are/is caused to increase, hence it is required to increase the diameter of the fulcrum shaft 209, and this results in making the hydraulic clamp 202 bulky.

SUMMARY OF THE INVENTION

The present invention is intended to accomplish the following objects with simultaneous miniaturization and simplification of its construction.

An object of the present invention is to ensure against dust or outside debris getting into the clamp housing to cause malfunction of the clamp arm, hydraulic cylinder and the like.

Another object of the present invention is to enable powerfully pushing back the clamp arm by means of a elastic body.

A still another object of the present invention is to minimize the size and the diameter of the fulcrum shaft supporting the clamp arm in a hydraulic clamp apparatus.

These and other related objects are realized by providing a hydraulic clamp with a swinging clamp arm wherein inside a clamp housing a swingable clamp arm and a hydraulic cylinder are arranged one before the other longitudinally, the clamp arm is pivotally supported near its lower end by a fulcrum shaft connecting both sides walls of the clamp housing to swing freely in the longitudinal direction, an elastic body is provided to push back the clamp arm to be inward of the front face of the clamp housing and the clamp arm is driven to be swung forward to be beyond the front face of the clamp housing as the piston of the hydraulic cylinder is moved forward, and the aforesaid elastic body is provided to extend from a mid-height point of the clamp arm to a constituent member of the hydraulic cylinder located behind thereof. The hydraulic cylinder assembly comprises fixed members such as bottom and peripheral wall and movable members such as piston rod.

This invention, which relates to the aforesaid construction, has the following advantageous features.

(1) unlike the prior art construction, it is no longer necessary to provide in the clamp arm a notch for housing the spring, hence it is not easily possible for dust outside to get into the clamp housing and find its way onto the back of the clamp arm or the sliding face of the piston to cause malfunction thereof;

(2) it is possible to increase the arm length of the moment required for swinging back the clamp arm, hence it is possible to powerfully push back the clamp arm at the time of unclamping;

(3) since it is no longer necessary to provide a notch in the clamp arm unlike in the prior art counterpart, there is no possibility of the force applied by the clamp arm to the fulcrum shaft due to the clamp reaction force acting unevenly toward either (longitudinal) end of the fulcrum shaft, being instead distributed almost evenly throughout the entire length thereof. Hence the bending moment and the shearing force acting on the fulcrum shaft are reduced, as is the required diameter of the fulcrum shaft.

BRIEF DESCRIPTION OF THE DRAWINGS

FIGS. 1 through 10 show embodiments of the present invention, while

FIGS. 1 through 3 show a first referred embodiment of the present invention, of which FIG. 1 is a longitudinal side sectional view of a hydraulic clamp;

FIG. 2 is a front elevation of the hydraulic clamp; and

FIG. 3 is a plan view of the hydraulic clamp.

FIG. 4 is a partial view showing the second embodiment, being equivalent to FIG. 1.

FIG. 5 is a partial view showing the third embodiment, being equivalent to FIG. 1.

FIG. 6 is a view showing the fourth embodiment, being equivalent to FIG. 1.

FIG. 7 is a view showing the fifth embodiment, being equivalent to FIG. 1.

FIGS. 8 through 10 show the sixth embodiment, of which

FIG. 8 is a plan view of a multiple hydraulic clamp,

FIG. 9 is a sectional view taken along line IX—IX of FIG. 8,

FIG. 10 is a partial sectional view taken along line X—X of FIG. 8.

FIG. 11 is a longitudinal side sectional view of a hydraulic clamp according to a first example of the prior art 1.

FIGS. 12 and 13 show a hydraulic clamp according to another example of the prior art, of which FIG. 12 is a longitudinal side sectional view of the hydraulic clamp; and FIG. 13 is a front elevation of the hydraulic clamp.

DESCRIPTION OF THE PREFERRED EMBODIMENT

The present invention will become more fully understood from the following description of some preferred embodiment thereof, which is to be taken in conjunction with the accompanying drawings. It should be clearly understood, however, that the description of the embodiments and the drawings are all provided purely for the purposes of illustration and exemplification only and are in no way to be taken as limitative of the scope of the present invention.

The First Embodiment

Figure 1:
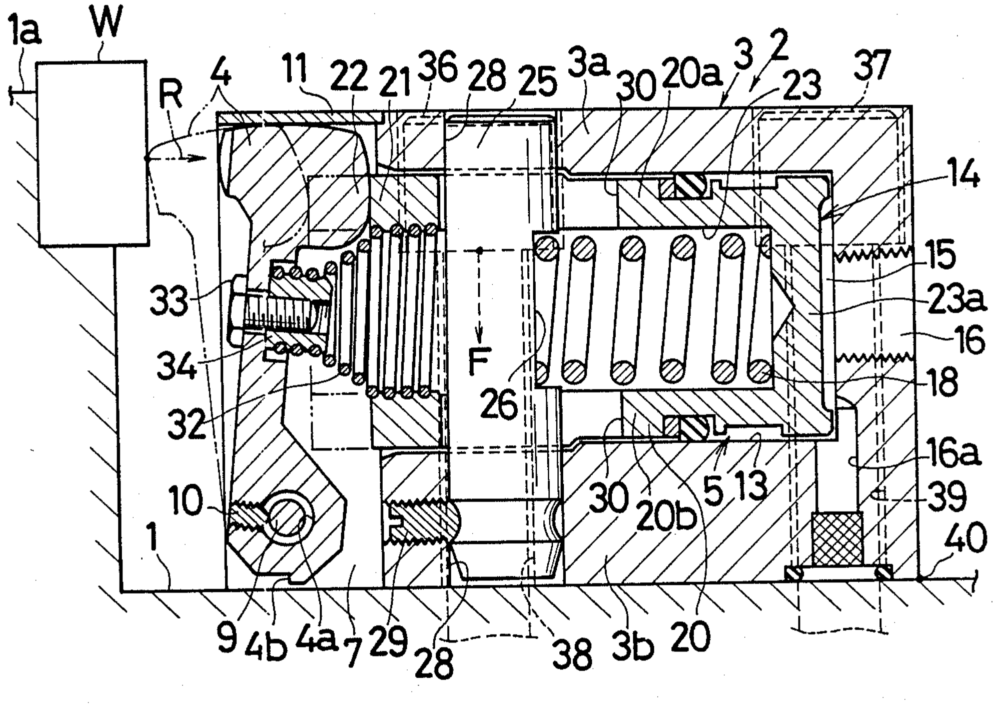
Figure 2:
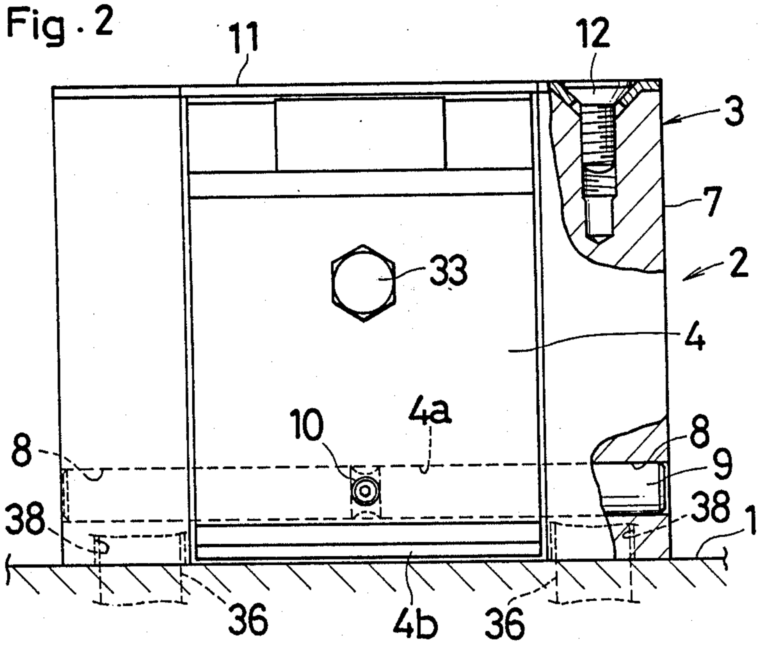
Figure 3:
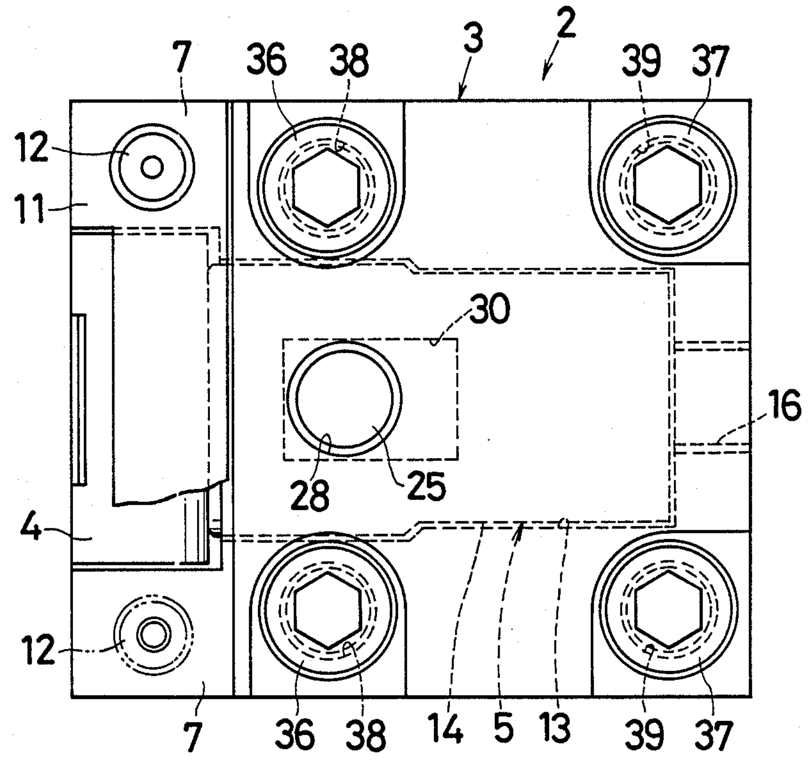

In the figures, reference numeral 1 is a work pallet, and a work W is fixed to a work holding jig 1*a* of this work pallet 1 by means of a hydraulic clamp 2. This hydraulic clamp 2 comprises a clamp housing 3 which is fixedly attached to the work pallet 1 and in the front portion of the clamp housing 3 is provided a claw-shaped clamp arm 4 and in the rear portion thereof is provided a hydraulic cylinder 5 for driving the clamp arm 4. In FIG. 1 the solid line shows the arrangement in unclamped condition and the two-dot chain line shows that in clamped condition.

First, explanation is provided of the aforesaid clamp arm 4.

The left and right walls 7, 7 of the clamp housing 3 are extended and near their bottom there are formed fulcrum holes 8, 8 with their centers agreeing sideways as viewed from front. Between the extended side walls 7, 7 the clamp arm 4 is placed and a fulcrum shaft 9 is set through both fulcrum holes 8, 8 and another formed near the lower end of the clamp arm 4 in between. To this fulcrum shaft 9 the clamp arm 4 is fixedly secured by means of a setscrew 10 and thereby this clamp arm 4 is made freely swingable longitudinally and pivotally supported with respect to the fulcrum holes 8, 8.

There is provided a scraper 11 in contact with the top end of the aforesaid clamp arm 4 as it swings. This scraper 11 is set between the left and right walls 7, 7 and both ends of the scraper 11 are fixedly secured to both side walls 7, 7 by means of countersunk screws. Near the lower end of the clamp arm 4 there is provided a scraper projecting therefrom, and this scraper 4*b* can be brought into contact with the work pallet 1.

Then the aforesaid hydraulic cylinder 5 is explained. This hydraulic cylinder 5 is of the spring-return single acting type.

In the clamp housing 3 there is provided a cylinder chamber 13 extending longitudinally, and into this cylinder chamber 13 a piston 14 is inserted to be oiltight and freely slidable. Behind this piston a drive chamber 15 is provided. Reference numeral 16 is a oil supply-discharge port and 16*a* is a spare port. Also provided is a return spring 18 which urges the aforesaid piston 14 rearward. When pressure oil is supplied to the drive chamber 15, the piston 14 is driven forward against the urging force of the aforesaid return spring 18, while, when the pressure oil is reduced in the drive chamber 15, the piston 14 is caused to retract by the urging force of the return spring 18.

A cylindrical piston rod 20 is projected forwardly from the aforesaid piston 14 and an output part 21 at the forward end of this piston rod 20 comes into contact with the back of the clamp arm 4 at the point of application of force. The aforesaid return spring 18 is inserted into the cylindrical hole 23 of the piston rod 20. This return spring 18 consists of a compression coil spring and its rear end is held by the rear end 23*a* of the cylindrical hole 23 and, at the same time, the front end is held by the clamp housing 3 via a spring holding pin 25.

That is, a pair of pin holding holes 28, 28 are provided in the top 3a and bottom 3b at the corresponding positions for the clamp housing 3 comprising the part near the front end of the clamp housing 3, piston rod 20 and the cylindrical hole 23 of the piston rod 23. The spring holding pin 25 is set between the aforesaid pin-holding holes 28, 28 to be held at both ends. The lower end of this spring holding pin 25 is secured to the clamp housing 3 with a setscrew 29. on the rear side of the middle portion of the vertically set spring holding pin 25 is formed a slot 26 for holding the forward end of the return spring 18.

Meanwhile, the piston rod 20 has formed therein a pair of grooves 30, 30 for avoiding interference with the aforesaid spring holding pin 25. Both anti-interference grooves 30, 30 are so formed as to allow passing through the upper peripheral wall section 20a and lower peripheral wall section 20b of the piston rod, at the same time extending longitudinally. Also, it is so designed that, when the piston 14 has moved forward, the piston rod 20 does not come into contact with the spring holding pin 25.

In the above-described construction, an elastic body is provided for pushing back the clamp arm 4 to be inward of the front face. This elastic body in the preferred embodiment comprises a cone-shaped tension coil spring 32 and is provided to extend from the middle portion in height of the clamp arm 4 to some constituent member of the hydraulic cylinder 5 located behind the clamp arm 4. That is, a nut 34 is screwed down on a bolt 33 to be secured to the middle portion in height of clamp arm 4, and to this nut 34 the front end of the coil of the tension coil spring 32 is connected by screwing. Meanwhile, the rear end o the coil of the tension coil spring 32 is connected by screwing with the front end of cylindrical hole 23 of the piston rod 20 as a movable member of the hydraulic cylinder 5.

The hydraulic clamp 2 of the above-described construction is fixedly secured to the work pallet by the use of a pair each of fastening bolts 36, 37 for the front and rear portions thereof. This means that in the front part of the clamp housing 3 a vertical pair of holes 38, 38 for fastening bolts are provided on both sides equidistant from the spring holding pin 25. Also, in the rear part of the clamp housing 3 a vertical pair of holes 39, 39 for fastening bolts are provided on both sides. Fastening bolts 36, 37 are set through the aforesaid bolt holes 38, 39 respectively.

Therefore, since the front fastening bolt holes 38 are safe from interference with the pin-holding holes 28 for the spring holding pins 25, it is that much possible to distribute the bolt holes 38 nearer to the front edge of the clamp housing 3. This means an increasedarm length for the moment of fastening force F for the fastening bolts 36 in the front row with respect to the rear edge 40 of the clamp housing as the fulcrum for inversion, hence the hydraulic clamp 2 is strongly fixed to the work pallet.

Further, since the aforesaid pin-holding holes 28 for the spring holding pins 25 are provided as through holes in the same direction with the holes 38, 39 for the fastening bolts, it is possible to drill these two types of holes 38, 39 as well as the pin holding holes 28, 28 from the same side as the holes to be made in the clamp housing 3. Hence, the number of working steps in manufacturing the apparatus can be decreased and less effort is required for manufacturing the hydraulic clamp 2.

In FIGS. 4 through 7 there are shown other embodiments and explained below are their differences from the first embodiment described above.

The Second Embodiment

Figure 4:
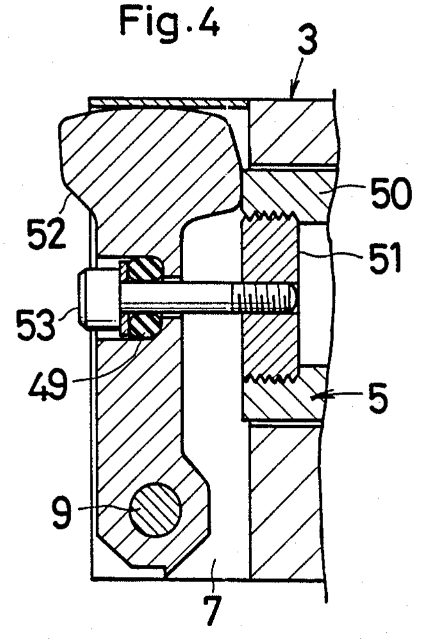

FIG. 4 illustrates the second embodiment of the present invention.

In this embodiment the elastic body consists of an elastic member 49 such as rubber. At the front end of a piston rod 50 of the hydraulic cylinder 5 a nut member 51 is screwed tightly. Meanwhile, a bolt 53 passing through a clamp arm longitudinally is provided and this bolt 53 has tightened thereon da nut member 51. Between the head of the aforesaid bolt 53 and the clamp arm 52 there is provided an elastic 49 consisting of an annular molded piece of rubber member.

The Third Embodiment

Figure 5:
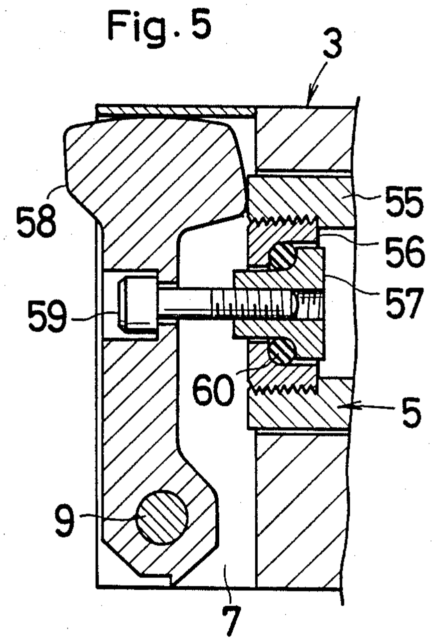

FIG. 5 shows the third embodiment of the present invention, which, compared with the above FIG. 4, is modified as follows. At the front end of a piston rod 55 of the hydraulic cylinder 5 a cylindrical stop member 56 is fixed by screwing and this stop member 56 with its cylindrical hole has a member 57 connected therewith by screwing from behind. Meanwhile, there is provided a bolt 59 passing through a clamp arm 58 longitudnally and this bolt 59 has tightened thereon a nut member 57. Between the stop member 56 and the member 57 there is provided an elastic member 60 consisting of rubber molded in an annular form.

The Fourth Embodiment

Figure 6:
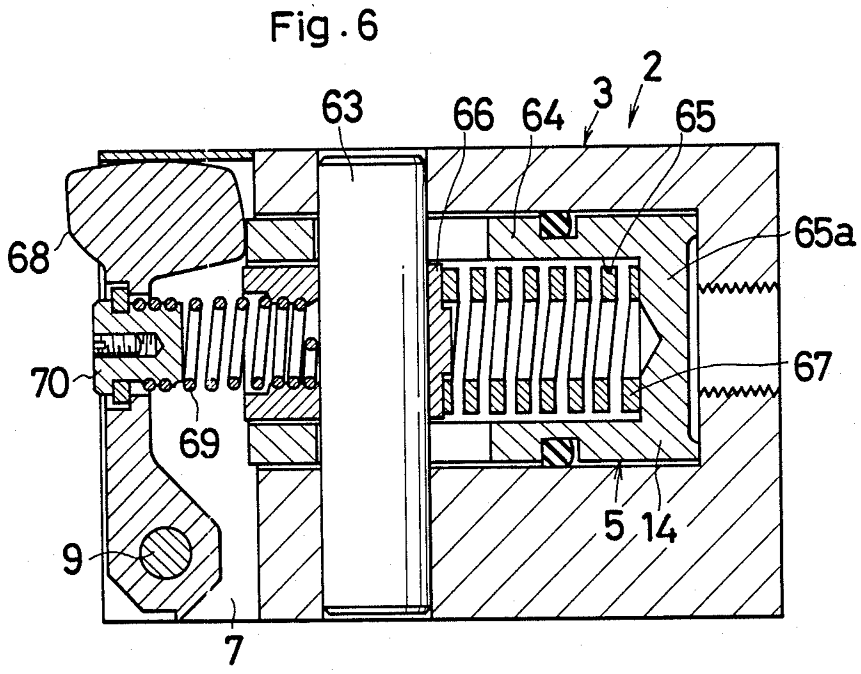

FIG. 6 shows the fourth embodiment of the present invention.

In this embodiment a spring holding pin 63 is formed to be upright and in a cylindrical hole 65 of a piston rod 64 of the hydraulic cylinder 5 a holding jig 66 for the return spring is fixed to the spring holding pin 63 inside the cylindrical hole 65 of the piston rod 64 of the hydraulic cylinder 5. Between the holding jig 66 of the return spring 67 and the rear end wall 65a of the cylindrical hole 65 of the piston rod 64 is provided a return spring 67. This return spring 67 consists of a square-sectioned compression spring.

An elastic body consisting of a tension coil spring 69 is provided to extend from the middle in height of a clamp arm 68 to the holding jig 66 for the return spring which is a fixed member of the hydraulic cylinder 5. That is, the spring mount 70 is fixedly attached to the middle point in height of the clamp arm 68. Thus, the front end of the tension coil spring 69 is screwed to the spring mount 70 and simultaneously the rear end of the tension coil spring 69 is screwed to the front end of the holding jig 66 for the return spring.

The Fifth Embodiment

Figure 7:
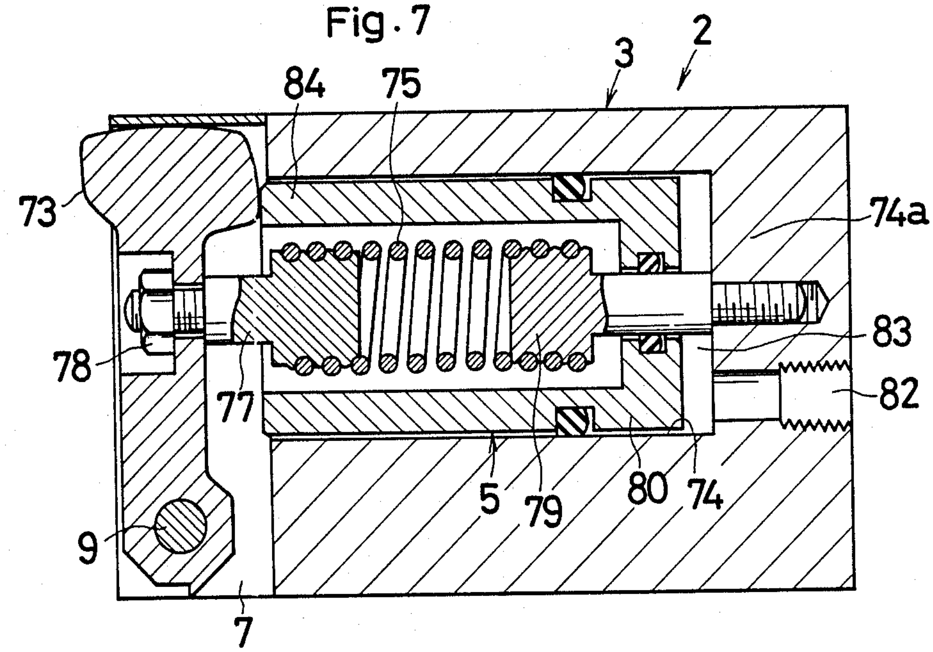

FIG. 7 shows the fifth embodiment of the present invention.

In this embodiment an elastic body consisting of a tension spring 75 is provided to extend from the middle in height of a clamp arm 73 and the bottom wall 74a of a cylinder chamber 74 which is a fixed member of the hydraulic cylinder 5. That is, the front end of a front spring mount 77 fixed to the a point about the mid-point in height of the clamp arm by means of a nut 78 and the rear end of a rear spring mount 79 is fixed to the bottom wall 74 of the cylinder chamber 74. This rear spring mount 79 is so arranged that its longitudinally center portion passes through a piston 80 and make the piston 80 oiltight and freely slidable. Thus, the front end of the tension coil spring 75 is screwed to a front spring mount 77 and simultaneously the rear end of the aforesaid tension coil spring 75 is screwed to the rear spring mount 79.

In the above construction the return of the piston 80, too, is done by the restoring force of the tension coil spring 75. When the pressure oil is supplied into a drive chamber 83 through an oil supply port 82, the piston 80 is driven forward against the urging force of the tension coil spring 75 and simultaneously the clamp arm 73 is driven forward by a psiton rod 84. When the pressure oil is reduced by discharged oil from the drive chamber 83, the piston 80 is pushed back by the elastic restoring force of the tension coil spring 75, this followed by moving back of the clamp arm 73.

The Sixth Embodiment

Figure 8:
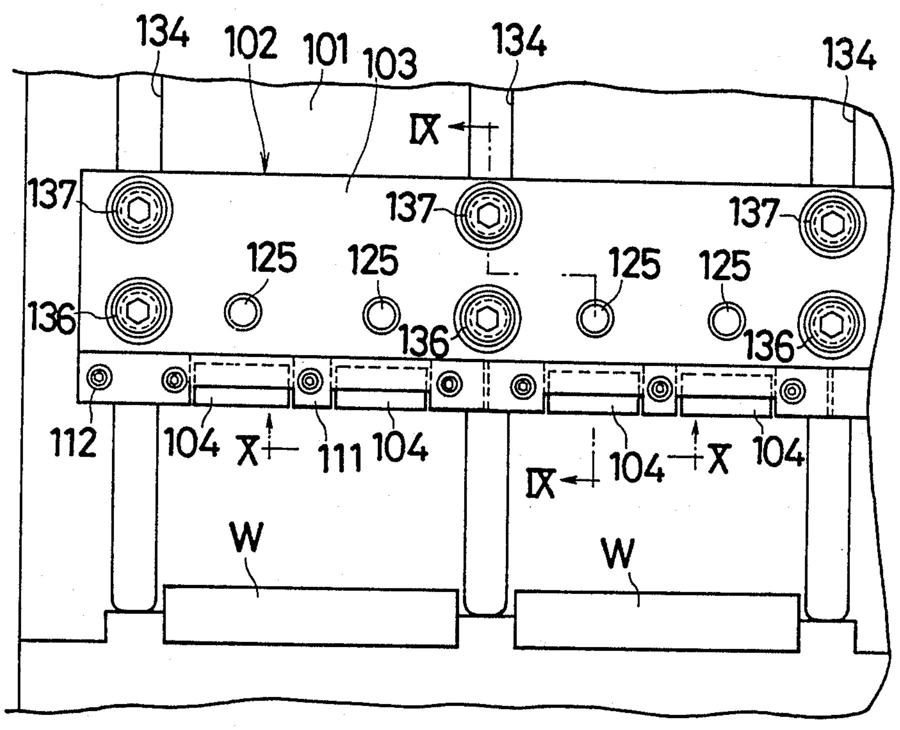
Figure 9:
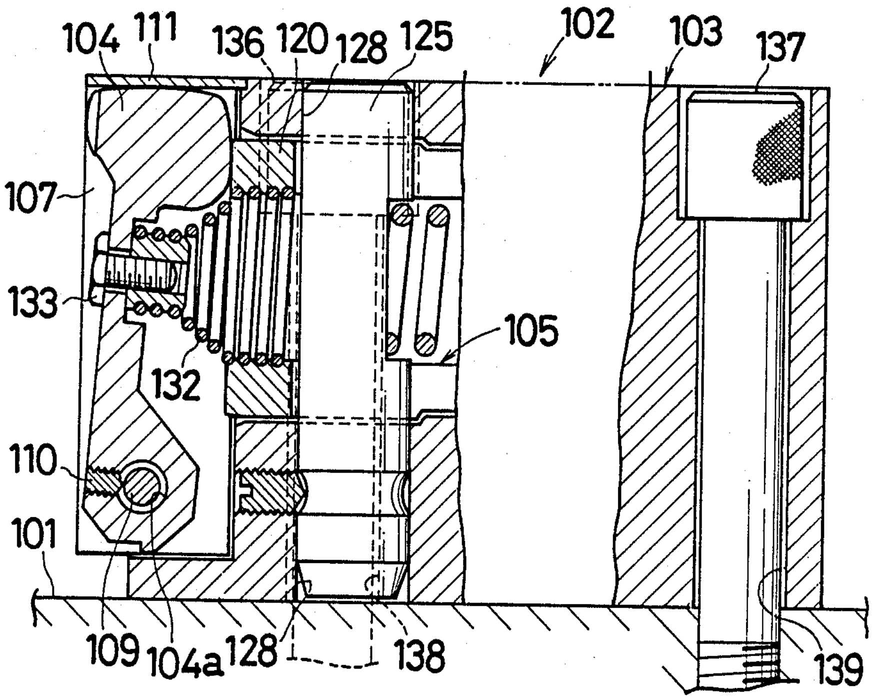
Figure 10:
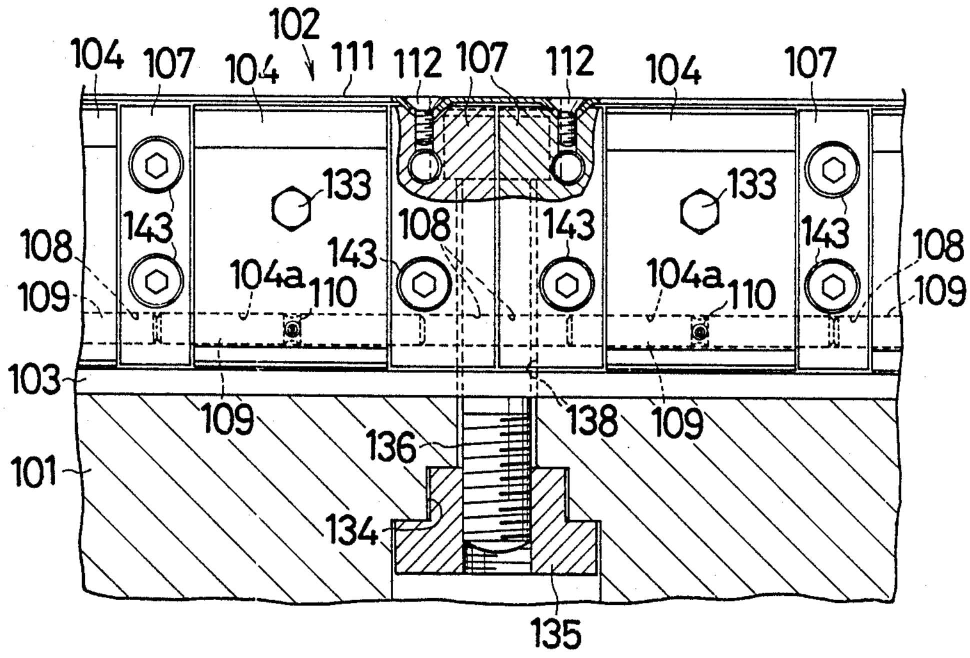
Figure 11:
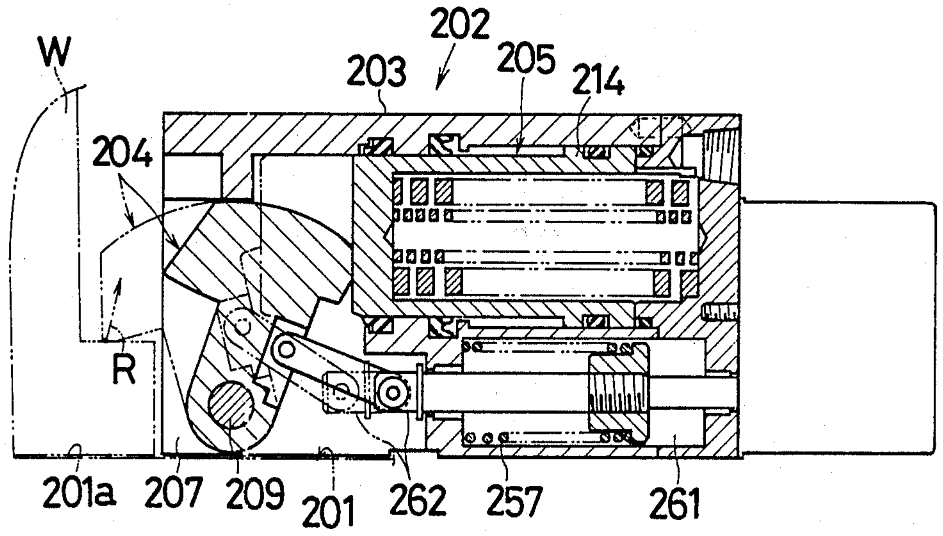
Fig. 11 PRIOR ART
FIGS. 11 through 13 show prior art counterparts.

FIGS. 8 through 10 show the sixth embodiment wherein there are used a multiplicity of hydraulic clamps. In this embodiment a work pallet 101 is provided with a multiplicity of hydraulic clamps 102 so that a multiplicity of workpieces can be clamped simultaneously. A clamp housing 103 is constructed using long square bars and has front and rear vertical through bolt holes 138, 139 for fixing by bolting. Front fastening bolts 136 are set through the front bolt holes 138 and rear fastening bolts 137 set through the front bolt holes 139. The work pallet 101 has formed therein inverse T-sectioned grooves 134 in which a plurality of nuts 135 and a pluraity of front and rear fastening bolts 136, 137 are set for fixing the clamp housing 103. In the aforesaid clamp housing 103 there are provided properly spaced in the longitudinal direction the transverse direction in FIGS. 8 AND 10) a plurality of clamp arms 104 and hydraulic cylinders 105. These parts or members are substantially the same as shown in the aforesaid embodiment 1.

There are provided a plurality of clamp arm supporting frames 107 separate from the clamp housing 103, and each clamp arm supporting frame 107 is secured to the front portion of the clamp housing 103 by the use of fastening bolts 143. Near the lower end of each supporting frame 107 is provided a fulcrum hole 108 and a fulcrum shaft 109 is set through a supporting hole 104*a* of each clamp arm 104 and the fulcrum holes 108, 108 on both sides thereof. Each fulcrum shaft 109 is secured to the clamp arm 104 by means of setscrews 110. There is provided a scraper 111 which is in contact with the swingable top of each clamp arm 104. This is formed long and is secured to the top of each clamping arm supporting frame 107 by the use of countersunk screws. Between the middle portion in height of the clamp arm 104 and a piston rod 120 there is disposed an elastic body consisting of a tension coil spring 132 by the use of bolts 133.

Figure 12:
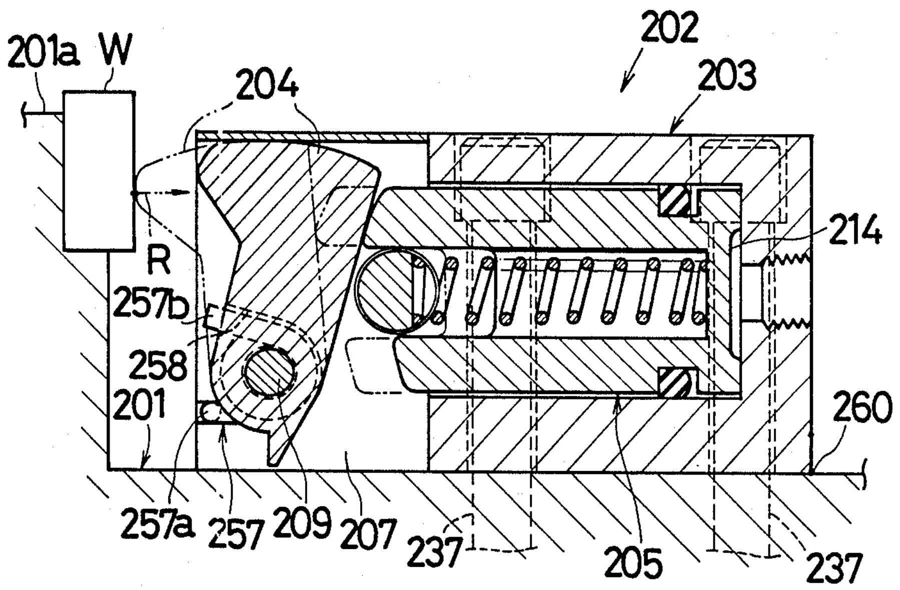
Fig. 12 PRIOR ART
Figure 13:
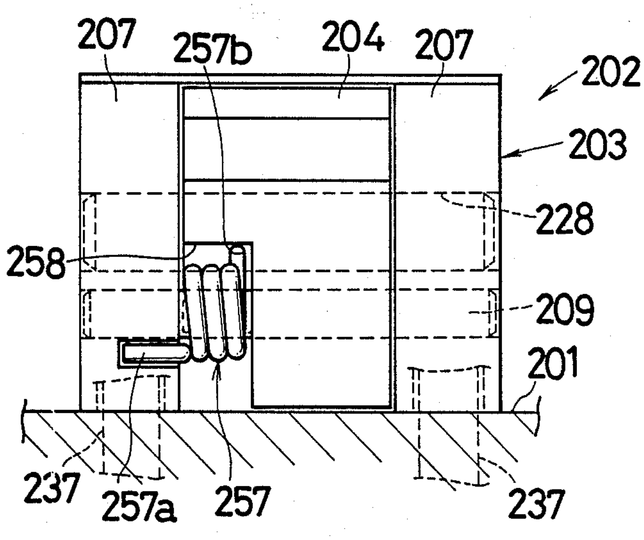
Fig. 13 PRIOR ART

Pin-supporting holes 128 of spring holding pins 125 are arranged to pass through the clamp housing 103 in the same way as described above in the embodiment 1. Hence, when a multiplicity of hydraulic clamps are used in the basic construction as described in the prior art per FIGS. 12 and 13 it is necessary to make long pin-supporting holes 228 along the longitudinal direction of a long clamp housing 203, requiring a lot of effort. According to the present invention, it suffices to form pin-supporting holes 128 to be spaced vertically, hence the length of each hole is smaller and easier to drill with simultaneous improvement in precision.

What is claimed is:

1. A hydraulic clamp with a swinging clamp arm, comprising:

a clamp arm and a hydraulic cylinder assembly slidably containing a piston, arranged one before the other longitudinally in a clamp housing, said clamp arm being pivotally held by a fulcrum shaft extending from both side walls of said clamp housing to be freely swingable longitudinally; and an elastic body for pushing back said clamp arm to be inward of a front face of said clamp housing, said clamp arm being driven to be outward of said front fact of said clamp housing when said piston in said hydraulic cylinder is driven forward, wherein said elastic body is disposed to extend from a first end contacting a mid-height position of said clamp arm to a second end contacting a portion of said hydraulic cylinder assembly.

2. A hydraulic clamp with a swinging clamp arm as recited in claim 1, wherein:

said second end of said elastic body contacts a movable portion of said hydraulic cylinder assembly.

3. A hydraulic clamp with a swinging clamp arm as recited in claim 1, wherein:

said elastic body comprises a tension coil spring.

4. A hydraulic clamp with a swinging clamp arm as recited in claim 1, wherein:

said hydraulic cylinder assembly comprises a spring-return type single-acting cylinder arranged so that said piston is pushed back in cylinder chamber by a return spring and is driven forward against said return spring when said cylinder is filled with pressurized oil, a piston rod provided with a hole and formed to project forward from said piston such that an output part at a forward end of said piston rod is caused to come into contact with the back of said clamp at a point of application of force, said return spring being inserted into said cylindrical hole of said piston rod, the rear end of said return spring being held by a rear end wall of said cylindrical hole, the front end of said spring also being held at a mid-portion thereof by a spring holding pin, said spring holding pin being set to cover said clamp housing, piston rod and said cylindrical hole of said piston rod and being held at both ends by means of a pair of pin holding holes provided therefor in said clamp housing, and a longitudinal groove formed in said piston rod for avoiding interference with said spring holding pin.

5. A hydraulic clamp with a swinging clamp arm as recited in claim 4, wherein:

a return spring holding jig for said return spring is fixedly attached to the mid portion of said spring holding pin.

6. A hydraulic clamp with a swinging clamp arm as recited in claim 1, wherein:

said hydraulic cylinder is arranged to enable forward driving of a piston inserted into a cylinder chamber to be oiltight and freely slidable longitudinally therein, a cylindrical piston rod provided with a hole and formed to project forward from said piston, the front end of said piston rod being disposed to make contact with the back of said clamp arm; an elastic body consisting of a tension coil spring inserted into said hole of said piston rod, the front portion of said tension coil spring being connected with said clamp arm, the rear portion of said tension coil spring being connected with a bottom wall of said cylinder chamber via a rear spring mount, said rear spring mount being arranged to pass through said piston longitudinally with a central portion staying therein so as to dispose said piston to be oiltight and freely slidable in said cylinder, said piston being driven forward by oil pressure built up in said cylinder by oil from an oil supply against an elastic force of said tension coil spring to thereby advance said clamping arm by said psiton rod, said clamping arm and piston being pushed back by said tension coil spring when said oil pressure is reduced.

7. A hydraulic clamp with a swinging clamp arm, comprising:

a clamp housing;

a hydraulic cylinder formed in a rear part of said clamp housing and connected to a source of pressurized fluid;

a piston slidably contained in said hydraulic cylinder to be driven by pressurized fluid supplied thereto and connected to a piston rod;

a swinging clamp arm pivotably supported by a fulcrum shaft held to said clamp housing to pivot thereon;

a return spring acting on said piston contrary to said pressurized fluid acting thereon such that said piston is slidably moved within said hydraulic cylinder by said return spring whena pressure of said pressurized fluid is sufficiently reduced, such that when said pressurized fluid is at a sufficiently high pressure said psiton is driven forward against a force of said return spring and acts on said swinging clamp arm through said piston rod contacting a back portion of clamp arm at a point of application of force, said piston rod being provided with a cylindrical hole to receive one end of said return spring, with another end of said return spring being acted upon by an inside surface of said piston; and a spring holding pin connected to said return spring between the ends thereof and held in said clamp housing while passing through said cylindrical hole of said piston rod, a longitudinal groove being formed in said piston rod for avoiding interference with said holding pin, said grooves being formed to be substantially vertically oriented through upper and lower wall sections of said clamp housing so as to dispose said spring holding pin vertically during motion of said piston against said force of said return spring.

8. A hydraulic clamp with a swinging clamp arm as recited in claim 1, further comprising:

lower scraper means connected to a lower end of said clamp arm for scraping a portion of a surface to which said hydraulic clamp is mounted for use.

9. A hydraulic clamp with a swinging clamp arm as recited in claim 1, further comprising:

upper scraper means positioned to contact an upper surface of said clamp arm for scraping the same during use of said hydraulic clamp.

10. A hydraulic clamp with a swinging clamp arm as recited in claim 9, further comprising:

lower scraper means connected to a lower end of said clamp arm for scraping a portion of a surface to which said hydraulic clamp is mounted for use.

11. A hydraulic clamp with a swinging clamp arm as recited in claim 7, further comprising:

lower scraper means connected to a lower end of said clamp arm for scraping a portion of a surface to which said hydraulic clamp is mounted for use.

12. A hydraulic clamp with a swinging clamp arm as recited in claim 7, further comprising:

upper scraper means positioned to contact an upper surface of said clamp arm for scraping the same during use of said hydraulic clamp.

13. A hydraulic clamp with a swinging clamp arm as recited in claim 12, further comprising:

lower scraper means connected to a lower end of said clamp arm for scraping a portion of a surface to which said hydraulic clamp is mounted for use.

* * * * *